(12) United States Patent
Oberreit

(10) Patent No.: US 11,181,459 B2
(45) Date of Patent: Nov. 23, 2021

(54) COMPACT CONDENSATION PARTICLE COUNTER TECHNOLOGY

(71) Applicant: Derek Oberreit, Roseville, MN (US)

(72) Inventor: Derek Oberreit, Roseville, MN (US)

(73) Assignee: KANOMAX-FMT, Inc., White Bear Lake, MN (US)

( * ) Notice: Subject to any disclaimer, the term of this patent is extended or adjusted under 35 U.S.C. 154(b) by 416 days.

(21) Appl. No.: 15/467,746

(22) Filed: Mar. 23, 2017

(65) Prior Publication Data

US 2017/0276589 A1 Sep. 28, 2017

Related U.S. Application Data

(60) Provisional application No. 62/311,997, filed on Mar. 23, 2016.

(51) Int. Cl.
*G01N 15/06* (2006.01)
*B01L 3/00* (2006.01)
*G01N 15/00* (2006.01)

(52) U.S. Cl.
CPC ... *G01N 15/065* (2013.01); *G01N 2015/0038* (2013.01); *G01N 2015/0046* (2013.01)

(58) Field of Classification Search
CPC ......... G01N 15/065; G01N 2015/0038; G01N 2015/0046; G01N 2015/0693

USPC .......................................................... 422/83
See application file for complete search history.

(56) References Cited

U.S. PATENT DOCUMENTS

| | | | | |
|---|---|---|---|---|
| 3,990,856 A | * | 11/1976 | Suzuki | F01N 3/26 422/176 |
| H1681 H | * | 10/1997 | Johanson | 162/243 |
| 2010/0010268 A1 | * | 1/2010 | Shirasawa | B01J 12/007 568/420 |
| 2015/0000595 A1 | * | 1/2015 | Gorbunov | G01N 15/065 118/716 |

OTHER PUBLICATIONS

Kanomax FMT, Fast Condensation Particle Counter, Model 3650: User Manual.

* cited by examiner

*Primary Examiner* — Matthew D Krcha
*Assistant Examiner* — Jacqueline Brazin
(74) *Attorney, Agent, or Firm* — Skinner and Associates; Joel D. Skinner, Jr.

(57) ABSTRACT

A particle vapor reactor (PVR) includes a reactor body with a fluid flow conduit having an inlet end and an outlet end, the crossection of the conduit having a circular geometry at the inlet end, a rectangular geometry at its midsection, and a circular geometry at its outlet end. The PVR conduit defines a saturator section and a condenser section. A compact condensation particle counter (CPC) including the reactor is also disclosed. The CPC also includes a sample inlet, a fluid inlet section, a heater section, and a detector section.

22 Claims, 17 Drawing Sheets

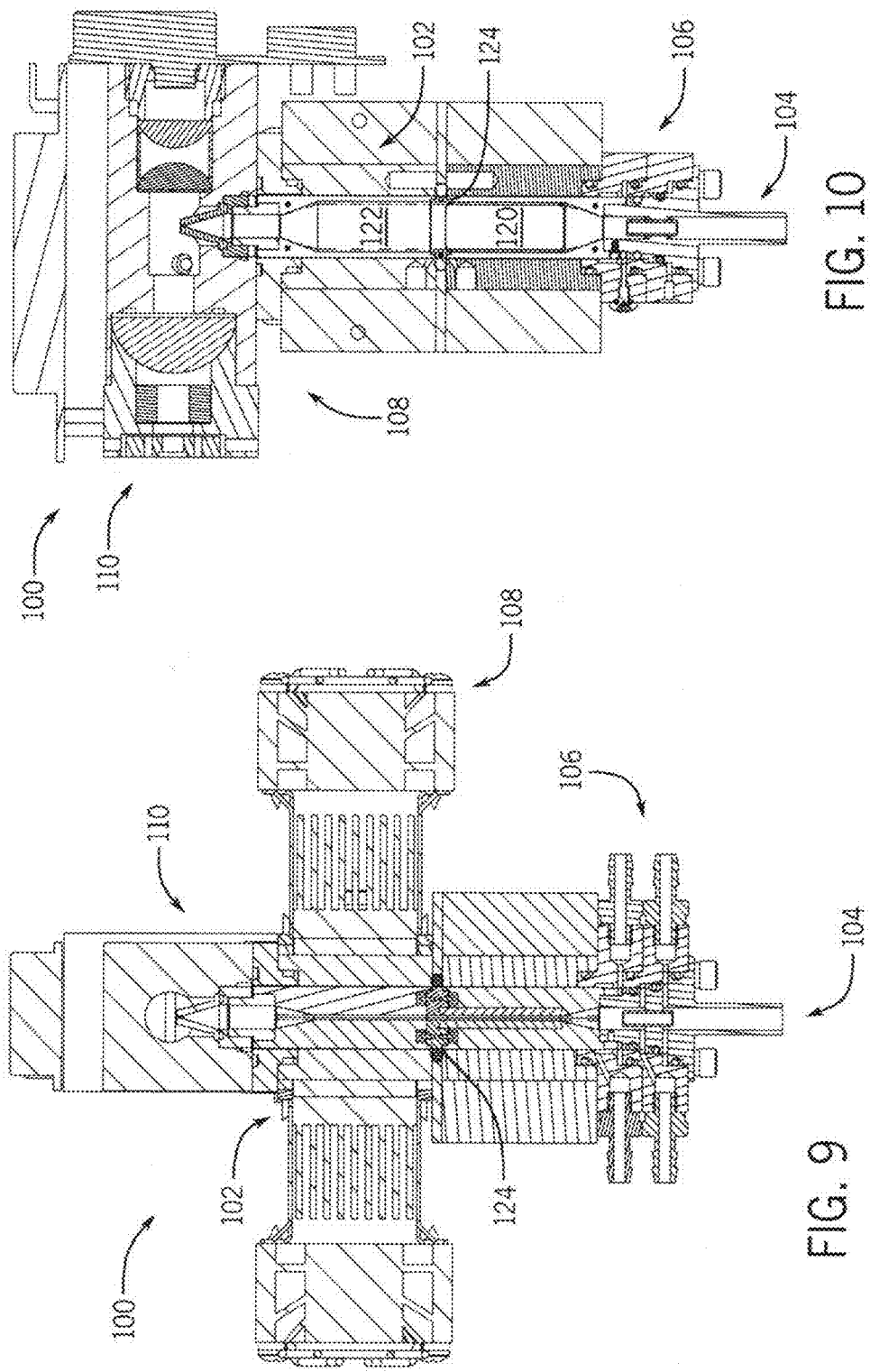

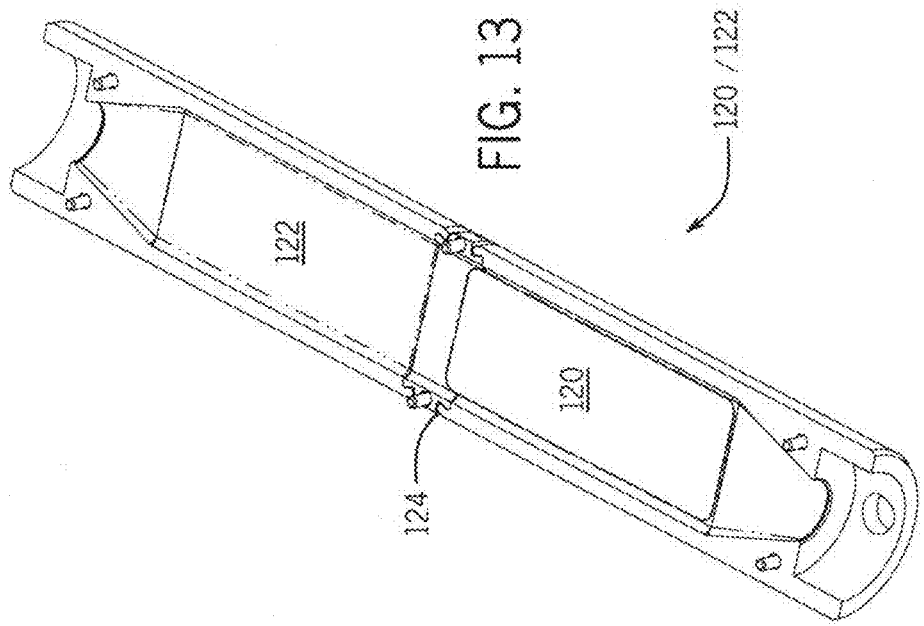
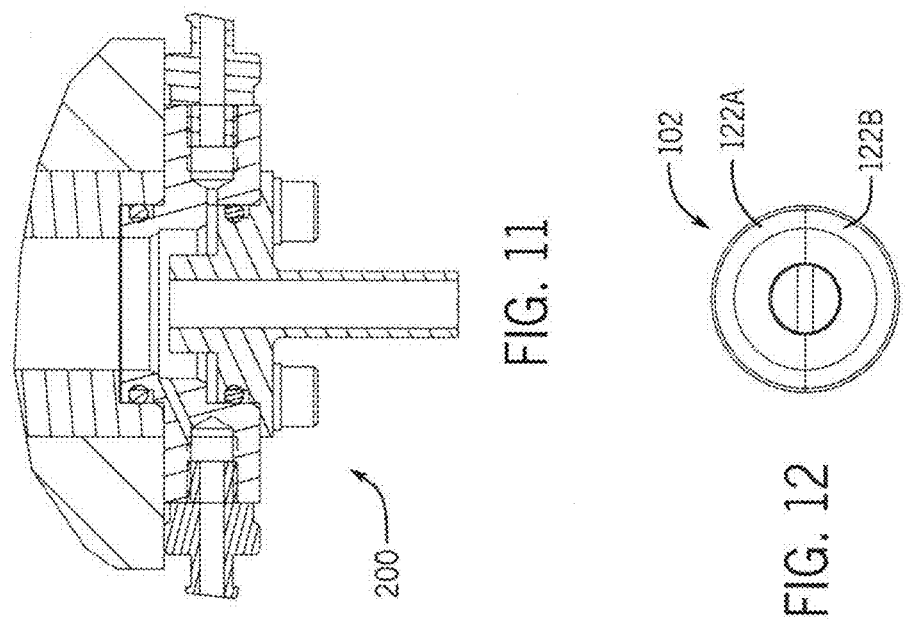
FIG. 13
FIG. 11
FIG. 12

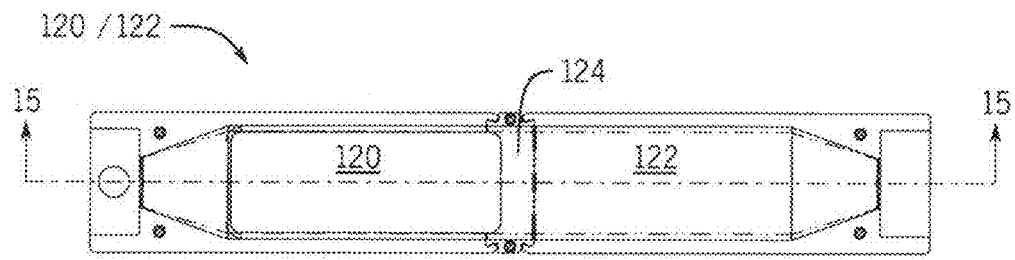
FIG. 14
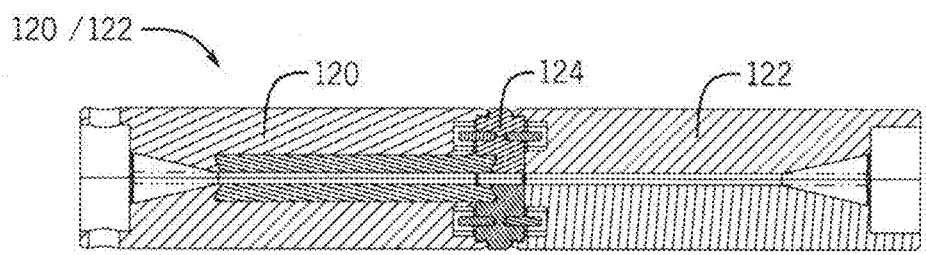
FIG. 15
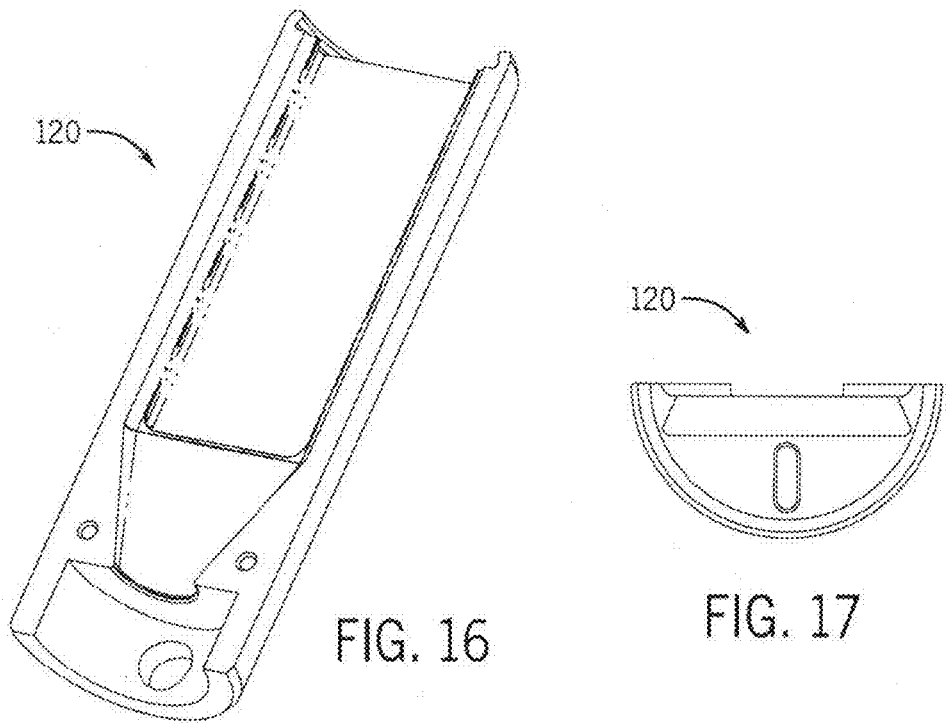
FIG. 16
FIG. 17

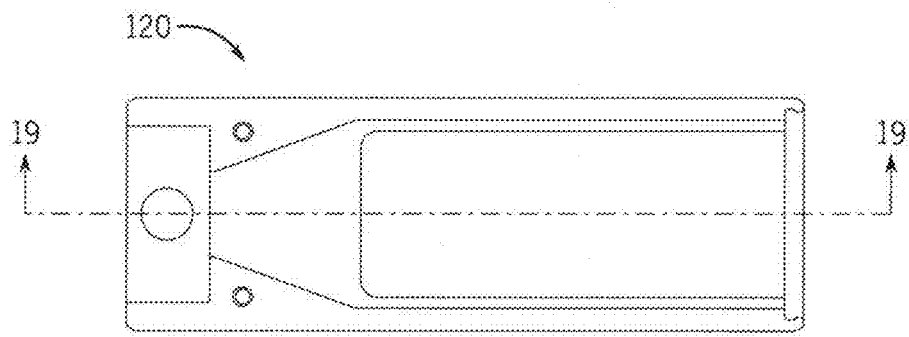
FIG. 18
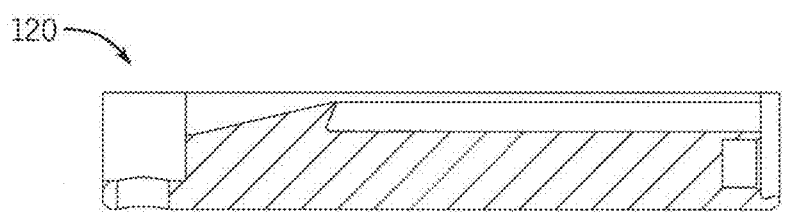
FIG. 19
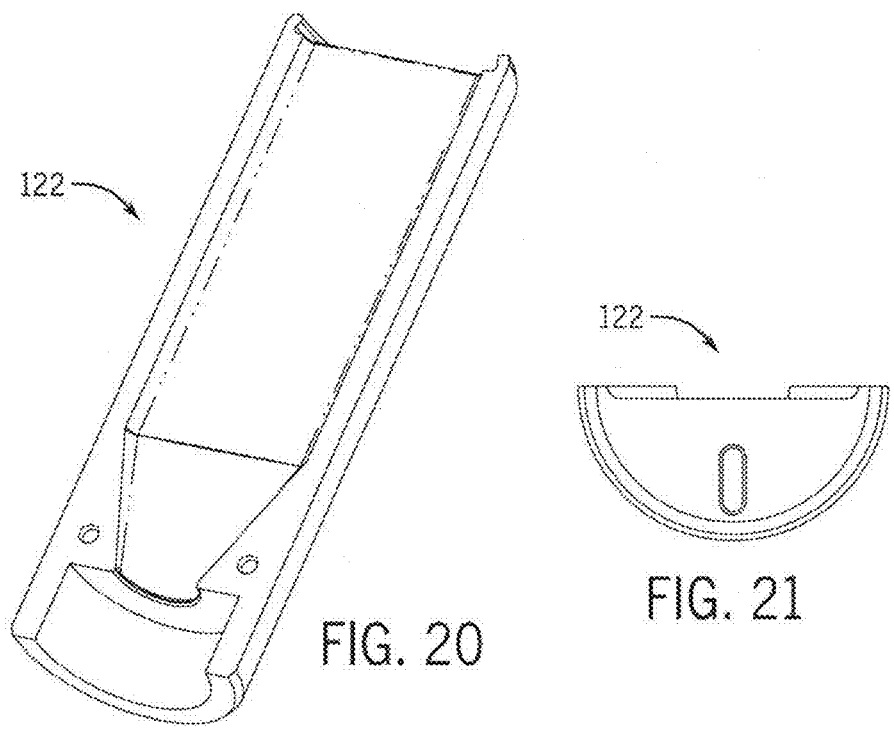
FIG. 20
FIG. 21

COMPACT CONDENSATION PARTICLE COUNTER TECHNOLOGY

CROSS-REFERENCE TO RELATED APPLICATIONS, IF ANY

This application claims the benefit under 35 U.S.C. § 119(e) of U.S. Provisional Patent Application Ser. No. 62/311,997, filed Mar. 23, 2016, which is hereby incorporated by reference.

37 C.F.R. § 1.71(e) AUTHORIZATION

A portion of the disclosure of this patent document contains material which is subject to copyright protection. The copyright owner has no objection to the facsimile reproduction by anyone of the patent document or the patent disclosure, as it appears in the US Patent and Trademark Office patent file or records, but otherwise reserves all copyright rights whatsoever.

STATEMENT REGARDING FEDERALLY SPONSORED RESEARCH OR DEVELOPMENT

Not applicable.

REFERENCE TO A MICROFICHE APPENDIX, IF ANY

Not applicable.

BACKGROUND OF THE INVENTION

1. Field of the Invention

The present invention relates, generally, to analysis methods and apparatus for analyzing material. Particularly, the invention relates to methods and apparatus for modifying properties of particles suspended in a gas. Most particularly, the invention relates to methods and apparatus for modifying particle properties within a gas by exposing the particles to a vapor of known composition and concentration. The technology is useful, for example, for aerosol characterization, aerosol collection, and particle detection.

2. Background Information

Existing technology in this field is believed to have significant limitations and shortcomings. For example, systems used to modify particle properties by vapor exposure require long sample paths (for cylindrical conduits) or cumbersome flow geometry (for rectangular conduits). The additional length and flow geometries increase the response time of these devices as well as increase particle deposition to the walls of the flow conduit.

A summary of the state of the art is provided by Peter H. McMurry (2000) The History of Condensation Nucleus Counters, *Aerosol Science and Technology*, 33:4, 297-322, DOI: 10.1080/02786820050121512, which is incorporated by reference.

All US patents and patent applications, and all other published documents mentioned anywhere in this application are incorporated by reference in their entirety.

BRIEF SUMMARY OF THE INVENTION

The present invention provides particle-vapor reactor (PVR) apparatus which is practical, reliable, accurate and efficient, and which are believed to constitute an improvement over the background technology.

The invention relates to an apparatus where the aerosol is introduced to the device using a cylindrical conduit that transitions to a rectangular conduit in a manner that limits flow separation. In one embodiment, the properties of the conduit walls differ than that of the aerosol for the purpose of modifying the gas properties within the aerosol. The sample aerosol occupies the entire cross section of the conduit or is sheathed by a gas having different properties than the aerosol. The aerosol sample exits the device from a rectangular conduit or the sample is transitioned to a cylindrical conduit. In one embodiment, the conduit is fabricated from porous material, a sintered polymer or metal, or using composite porous aluminum (such as METAPOR™). The invention also relates to a device where the number concentration (partial pressure) of a vapor is modified within an aerosol.

In one aspect, the invention relates to a PVR where the partial pressure of a vapor is greater than the partial pressure of that vapor over a flat surface composed the vapor's condensed phase (Supersaturation). For particles larger than a critical diameter, the vapor molecules condense onto the particles resulting in an increase of the particle diameter by orders of magnitude. The enlarged droplet/particle entities are easily detected using common light scattering methods and with knowledge of the counting rate and aerosol flow, a particle concentration can be calculated. At sufficiently high supersaturation levels, the condensation process will initiate for particles which are too small to be detected using optical methods typically employed for single aerosol particle counting. In this aspect, supersaturation is achieved via diabatic heat and mass transfer which is known within literature, for example by Susanne V. Hering & Mark R. Stolzenburg (2005), A Method for Particle Size Amplification by Water Condensation in a Laminar, Thermally Diffusive Flow, *Aerosol Science and Technology*, 39:5, 428-436, DOI: 10.1080/027868290953416, which is incorporated by reference.

In another aspect, the invention elates to a PVR where the partial pressure of a vapor is less than the partial pressure of that vapor over a flat surface composed the vapor's condensed phase (Subsaturation). This device can be used to raise or lower the vapor pressure within an aerosol to study sorption related phenomena and or chemical reactions between particles and vapor molecules.

Further aspects of the invention include:
A. A particle vapor reactor including a reactor body with a fluid flow conduit having an inlet end and an outlet end, the crossection of the conduit having a circular geometry at the inlet end, a rectangular geometry at its midsection, and a circular geometry at its outlet end.
B. The reactor of aspect A, wherein the geometry transition at the inlet end from circular to rectangular minimizes flow separation.
C. The reactor of aspect B, wherein the geometry at the inlet end transitions from circular to obround, and wherein the geometry at the outlet end transitions from obround to circular.
D. The reactor of aspect C, wherein the dimensions of the obround section of the fluid flow conduit reduce residence time of fluid flowing within the fluid flow conduit for a given vapor concentration.
E. The reactor of claim C, wherein the transition from obround to circular at the outlet end minimizes loss of vapor droplets due to inertia.
F. The reactor of aspect A, wherein an aerosol sample stream is input at the inlet end of the reactor body.

G. The reactor of aspect F, wherein the reactor changes the temperature and vapor concentration of a material within the aerosol sample flowing in the fluid flow conduit.

H. The reactor of aspect F, wherein the fluid flow in the conduit is laminar.

I. The reactor of aspect F, wherein the vapor concentration is changed towards the vapor concentration at the body wall of the conduit.

J. The reactor of aspect F, wherein the vapor concentration is increased via diffusion of vapor supplied from a liquid surface at the body wall of the conduit.

K. The reactor of aspect F, wherein the vapor concentration is decreased via diffusion of vapor to a liquid surface at the body wall of the conduit.

L. The reactor of aspect F, wherein the vapor concentration at the conduit body wall is defined by the temperature of the conduit body wall.

M. The reactor of aspect F, wherein the temperature of the aerosol sample flow is modified towards the temperature at the conduit body wall.

N. The reactor of aspect M, wherein the temperature of the aerosol sample flow is increased via diffusion of thermal energy from the conduit body wall.

O. The reactor of aspect M, wherein the temperature of the aerosol sample flow is decreased via diffusion of thermal energy to the conduit body wall.

P. The reactor of aspect F, wherein the vapor concentration within the aerosol sample is controlled to reach a predetermined, set value.

Q. The reactor of aspect P, wherein the predetermined vapor concentration of the aerosol sample flow is equivalent to the saturation vapor pressure defined by the conduit body wall temperature.

R. The reactor of aspect P, wherein the predetermined vapor concentration is not equivalent to the saturation vapor pressure defined by the conduit body wall temperature.

S. The reactor of aspect F, wherein the vapor concentration within the aerosol sample stream reaches a level above the saturation vapor pressure calculated using the aerosol sample stream temperature.

T. The reactor of aspect F, wherein a gas is coaxially input to the perimeter of the aerosol sample stream as a sheathing flow at the inlet end of the reactor body.

U. The reactor of aspect T wherein the vapor concentration in the sheathing flow gas is a predetermined, fixed value.

V. The reactor of aspect T, wherein the temperature of the sheathing flow gas is a predetermined, fixed value.

W. The reactor of aspect A, wherein the fluid flow conduit has a saturator section disposed towards the inlet end and a condenser section disposed towards the outlet end.

X. The reactor of aspect W, wherein the conduit is elongated and constructed of two lateral half portions, the lateral half portions being joined along the longitudinal axis of the reactor.

Y. The reactor of claim W, wherein the conduit is elongated and constructed of four quarter portions, the quarter portions being connected into two lateral half portions, which lateral half portions are then joined along the longitudinal axis of the reactor, the quarter portions of each longitudinal half portion further being separated from each other by a thermally and electrically insulative separator member.

Z. The reactor of aspect A, being communicatively coupled to a condensation particle counter comprising an aerosol sample inlet communicatively connected to the reactor inlet end, a fluid supply section communicatively connected to the reactor inlet end, a heating section communicatively connected to the exterior of the reactor body, and a detection section communicatively connected to the reactor conduit outlet end.

The present invention is believed to involve novel elements, combined in novel ways to yield more than predictable results. The problems solved by the invention were not fully recognized in the prior art.

The aspects, features, advantages, benefits and objects of the invention will become clear to those skilled in the art by reference to the following description, claims and drawings.

BRIEF DESCRIPTION OF THE SEVERAL VIEWS OF THE DRAWING

FIG. 9 is sectional view of the CPC of FIG. 8 showing a wide-wide aspect of the CPC, but a narrow aspect of the PVR.

FIG. 10 is another sectional view of the CPC, at a plane perpendicular to that of FIG. 8, showing a narrow-narrow aspect of the CPC and a wide aspect of the PVR.

FIG. 11 is an partial sectional view (the lower end portion) of an alternative embodiment of the PVR of FIGS. 8-10, wherein the vapor is unsheathed.

FIG. 12 is a top end view of the PVR of FIGS. 8-11.

FIG. 13 is a perspective view of one half (longitudinal half) of the PVR body.

FIG. 14 is an elevation view of the PVR body portion of FIG. 13.

FIG. 15 is a crossectional view of the PVR portion taken along line 15-15 of FIG. 14.

FIG. 16 is a perspective view of the bottom. body portion of the longitudinal half body portion of FIG. 13.

FIG. 17 is bottom end view of the quarter portion of FIG. 6.

FIG. 18 is an elevation view of the quarter portion.

FIG. 19 is a crossectional view of the quarter portion taken along line 19-19 of FIG. 18.

FIG. 20 is a perspective view of the top portion of the longitudinal half portion of FIG. 13.

FIG. 21 is top end view of the quarter portion of FIG. 20.

DETAILED DESCRIPTION

Figure 1:
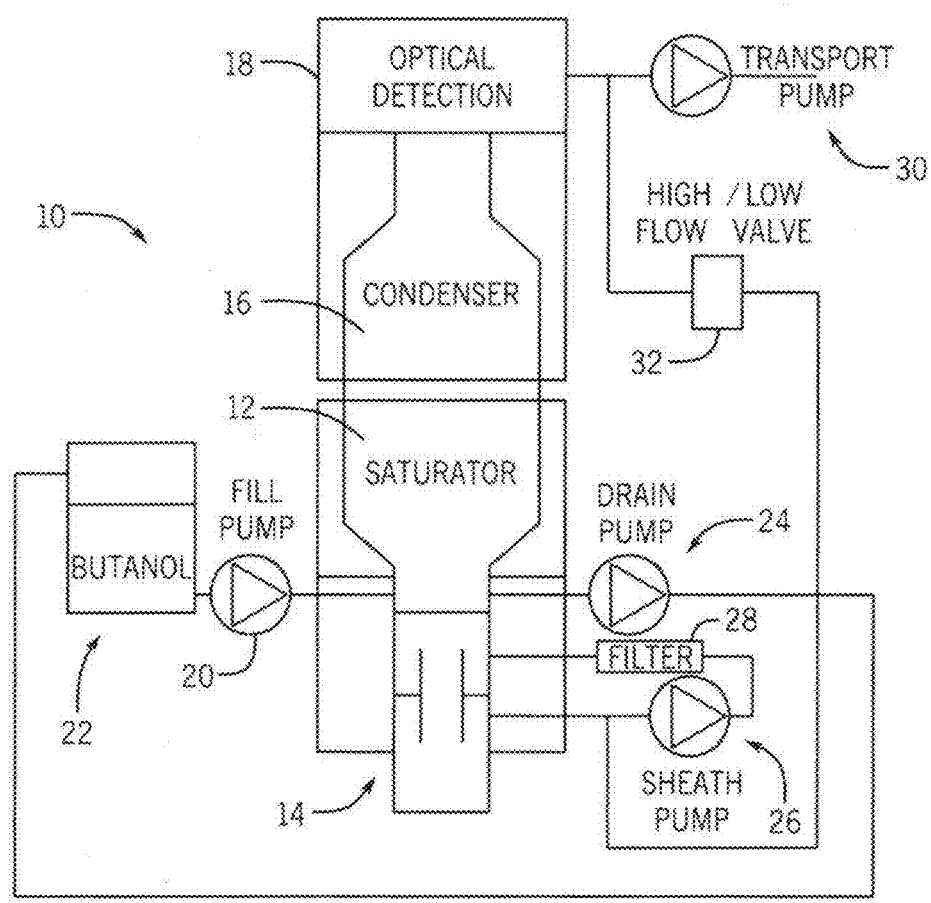
FIG. 1 shows a Condensation Particle Counter (CPC).

FIG. 1 shows a Condensation Particle Counter (CPC) 10 including a saturator 12 with a sample input end 14, a condenser 16, and an optical detector 18. A fill pump 20 is connected to the saturator 12. A fluid supply 22 (containing for example Butanol) is connected to the fill pump 20 and also communicatively to a drain pump 24. The drain pump 24 is also connected to the saturator 12. A sheath pump 26 is connected to the input end 14 and to a filter 28. A transport pump 30 is connected to the optical detector 18. A high/low flow valve 32 is communicatively connected to the optical detector 18, transport pump 30, input end 14 and sheath pump 26.

Figure 3:
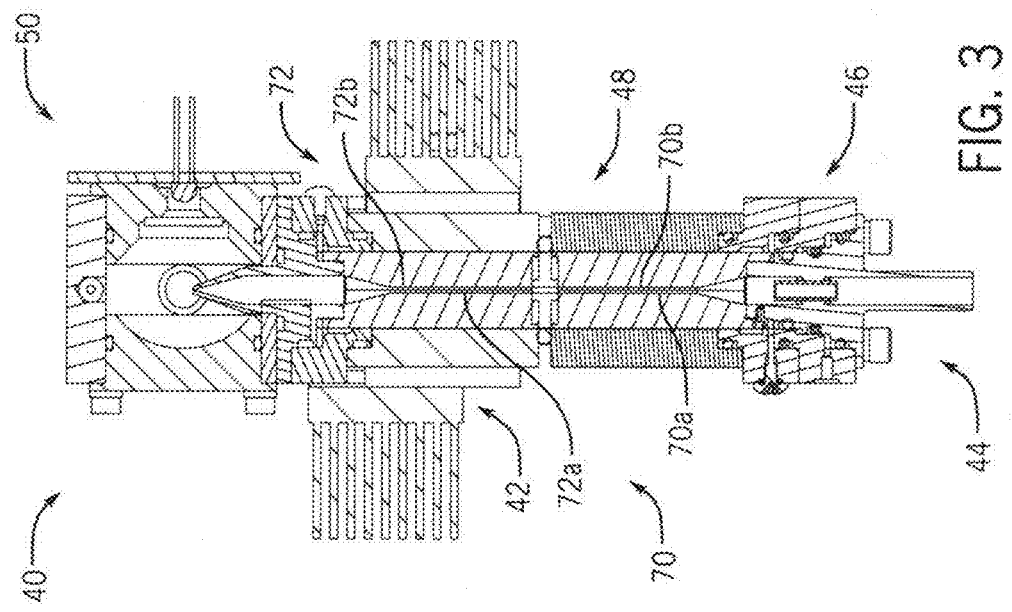
FIG. 3 is a further crossectional view of the CPC, taken at plane which is perpendicular to the plane shown in FIG. 1, showing a narrow aspect of the PVR.
Figure 2:
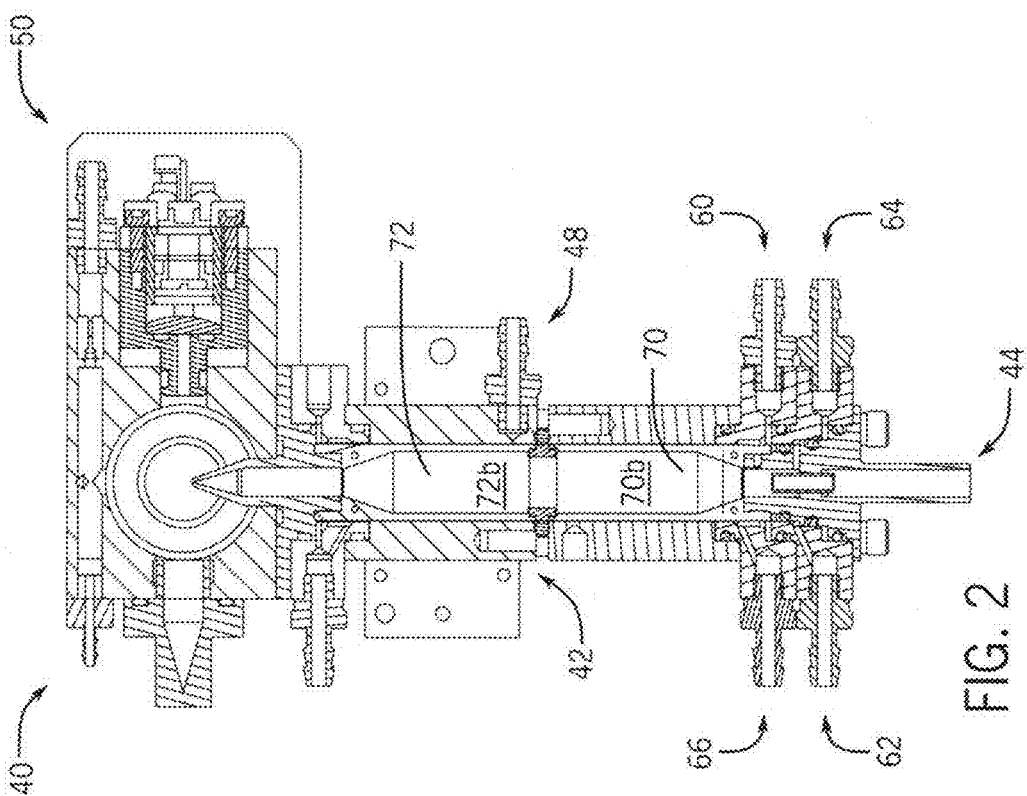
FIG. 2 is a crossectional view of a first embodiment of the Condensation Particle Counter (CPC) of the present invention, including an embodiment of a Particle Vapor Reactor (PVR) used therein in a wide aspect.

FIGS. 2 and 3 show a first embodiment of the Condensation Particle Counter (CPC) 40 of the invention. The CPC 40 includes a Particle-Vapor Reactor (PVR) 42, an aerosol inlet 44, a fluid supply section 46, a heating section 48, and an optical detection section 50. In this embodiment, the CPC 40 includes sample sheathing functionality. The fluid supply section 46 includes a liquid supply 60, a sheath inlet 62, a transport outlet 64, and a vent 66. The PVR 42 amplifies the size of Nano-particles for optical detection in section 50.

Figure 4:
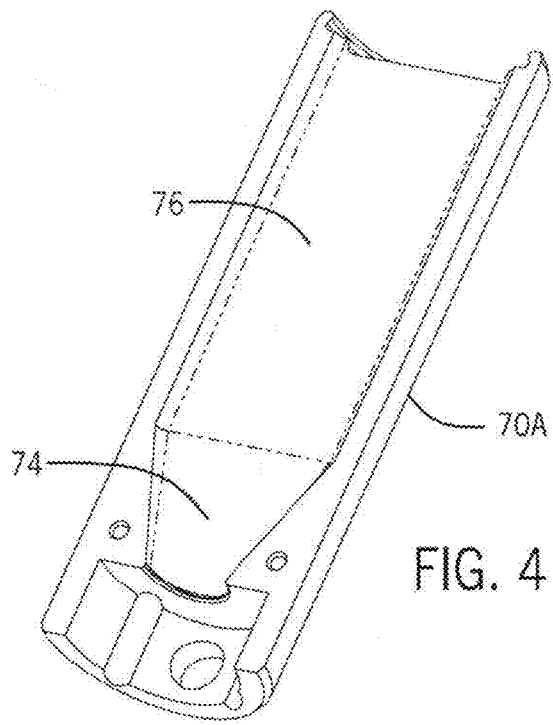
FIG. 4 is a perspective view of a portion of one embodiment of Particle Vapor Reactor body (PVR).
Figure 5:
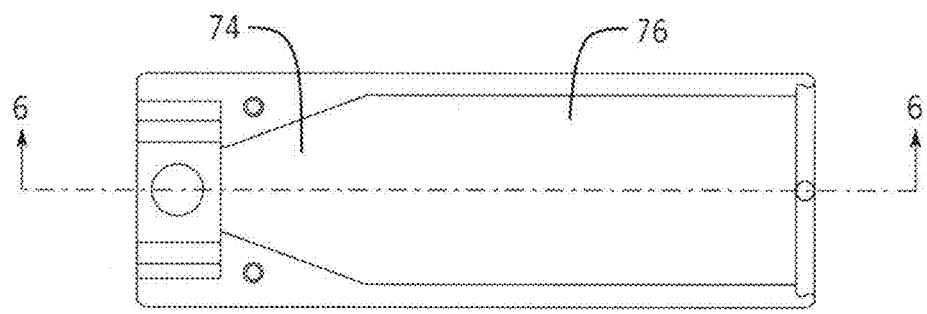
FIG. 5 is an elevation view of the PVR body element of FIG. 4.
Figure 6:
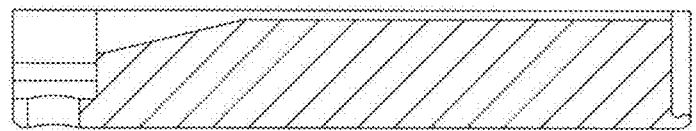
FIG. 6 is a crossectional view of the PVR body element taken along line 6-6 of FIG. 5.

Referring also to FIGS. 4-6, in this embodiment of the invention, the PVR 42 has an elongated body of a predetermined length. The body wall defines an inner, longitudinally oriented fluid flow conduit or lumen which extends from an input end (shown disposed at the lower or bottom end in the drawings) and an outlet end (shown disposed at the upper or top end in the drawings). The PVR 42 conduit has a conditioner or saturator section 70 and a growth or condenser section 72. The sections 70 and 72 are separated in this embodiment of the PVR 42 by a separator 74. The separator 74 thermally and electrically insulates the conditioner and growth sections 70 and 72 from each other. Further, each section 70 and 72 are preferably constructed of separate but connected lateral members 70 A/B and 72 A/B.

In the CPC 40, aerosol is introduced into the conditioner section 70 of the PVR 42 using a cylindrical conduit geometry 74 that transitions to a rectangular conduit geometry 76 (as best shown in FIGS. 4 and 5) in a manner that limits flow separation. The properties of the conduit walls differ than that of the aerosol for the purpose of modifying the gas properties within the aerosol. The conduit members 70A/B and 72A/B is preferably fabricated from porous material such as sintered polymer or metal, or using composite porous aluminum (Metapor™). The sample aerosol is preferably sheathed by a gas having different properties than the aerosol. The aerosol sample exits the growth section 72 of the device 42 by transitioning from a rectangular conduit to a cylindrical conduit. In this embodiment, the number concentration (partial pressure) of a vapor is modified within an aerosol.

Figure 7:
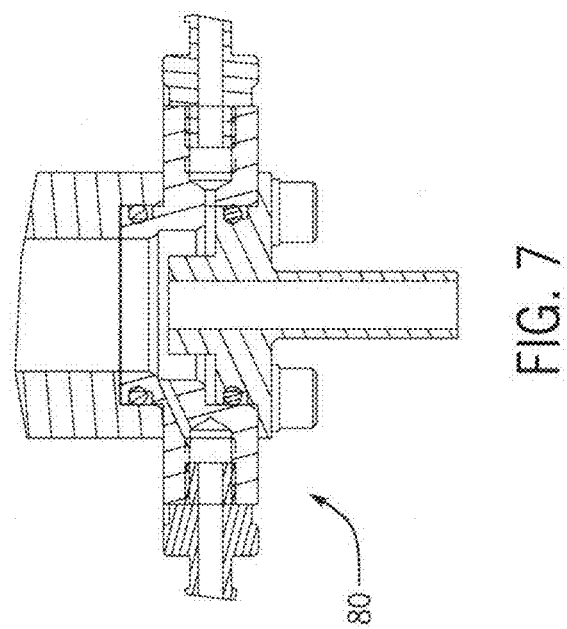
FIG. 7 is an partial sectional view (the lower end portion) of an alternative embodiment of the PVR wherein the vapor is unsheathed.
Figure 22:
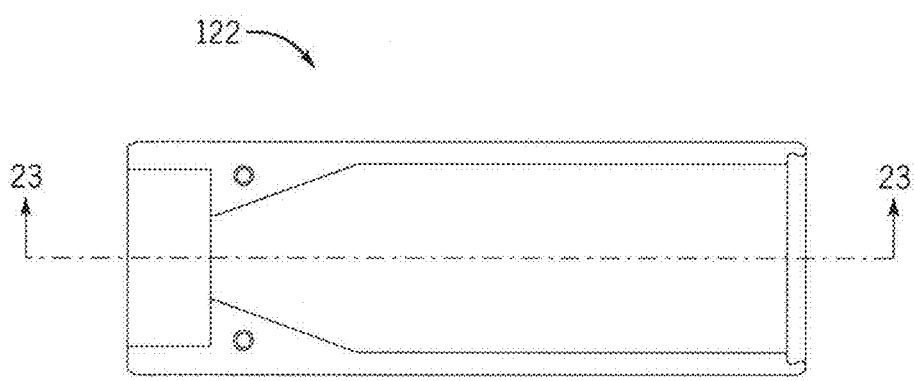
FIG. 22 is an elevation view of the quarter portion.
Figure 23:
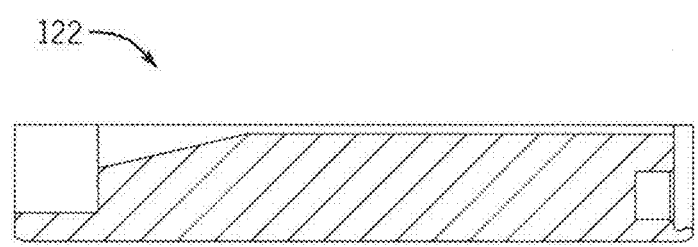
FIG. 23 is a crossectional view of the quarter portion taken along line 23-23 of FIG. 22.

Although the aerosol is disclosed as being sheathed in this embodiment, it is within the purview of the invention may he unsheathed, and occupy the entire crossection of the conduit. An example of a CPC operating unsheathed is shown in FIG. 7. Further, although the aerosol transitions from a rectangular geometry to a circular geometry upon exit, it is within the purview of the invention that it may exit at a rectangular geometry.

In one mode of use, the partial pressure of a vapor is greater than the partial pressure of that vapor over a flat surface composed the vapor's condensed phase (Supersaturation). For particles larger than a critical diameter, the vapor molecules condense onto the particles resulting in an increase of the particle diameter by orders of magnitude. The enlarged droplet/particle entities are easily detected using common light scattering methods via the detector section 50. And, with for a given counting rate and aerosol flow rate, a particle concentration is calculated. At sufficiently high supersaturation levels, the condensation process will initiate for particles which are too small to he detected using optical methods typically employed for single aerosol particle counting. In this embodiment, supersaturation is achieved via known diabatic heat and mass transfer processes.

In another mode of use, the partial pressure of a vapor is less than the partial pressure of that vapor over a flat surface composed the vapor's condensed phase (Subsaturation). This embodiment of the particle-vapor reactor can be used to raise or lower the vapor pressure within an aerosol to study sorption related phenomena and or chemical reactions between particles and vapor molecules.

FIG. 7 shows a modification to the bottom end of the CPC 40, forming an alternative embodiment, CPC 80, whereby the CPC 80 operates in an unsheathed mode.

Figure 24:
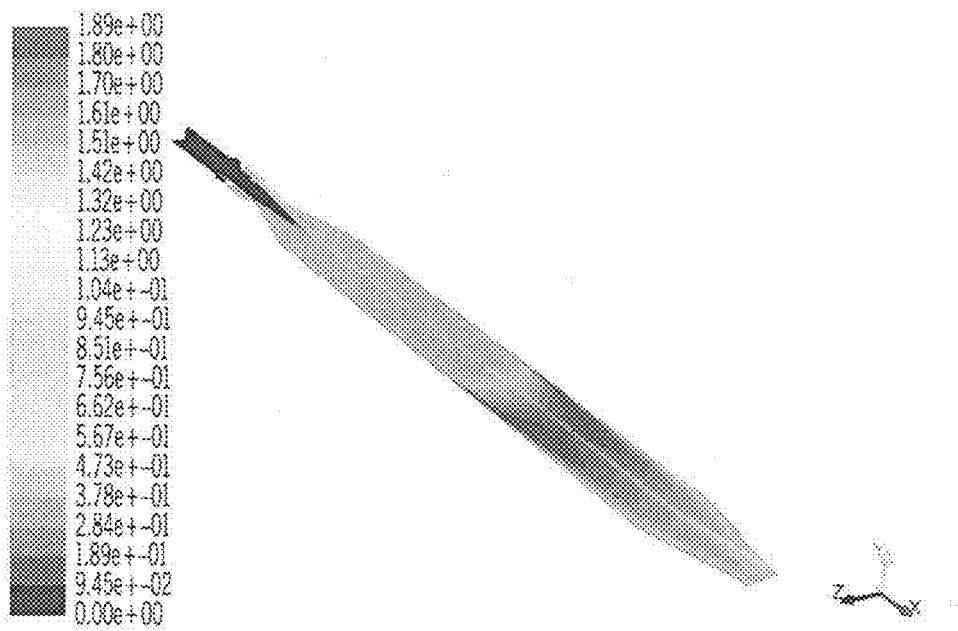
FIG. 24 shows the saturation ratio within a sheathed PVR fluid section.
Figure 25:
FIGS. 25 and 26 illustrate the flow within a sheathed device.
Figure 26:
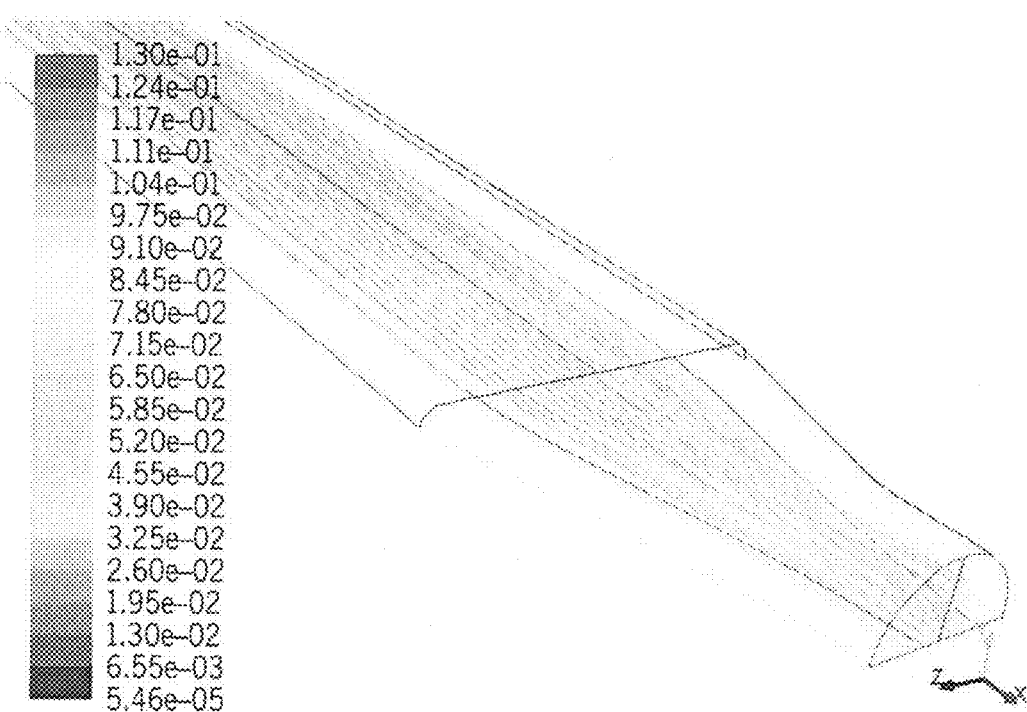
Figure 27:
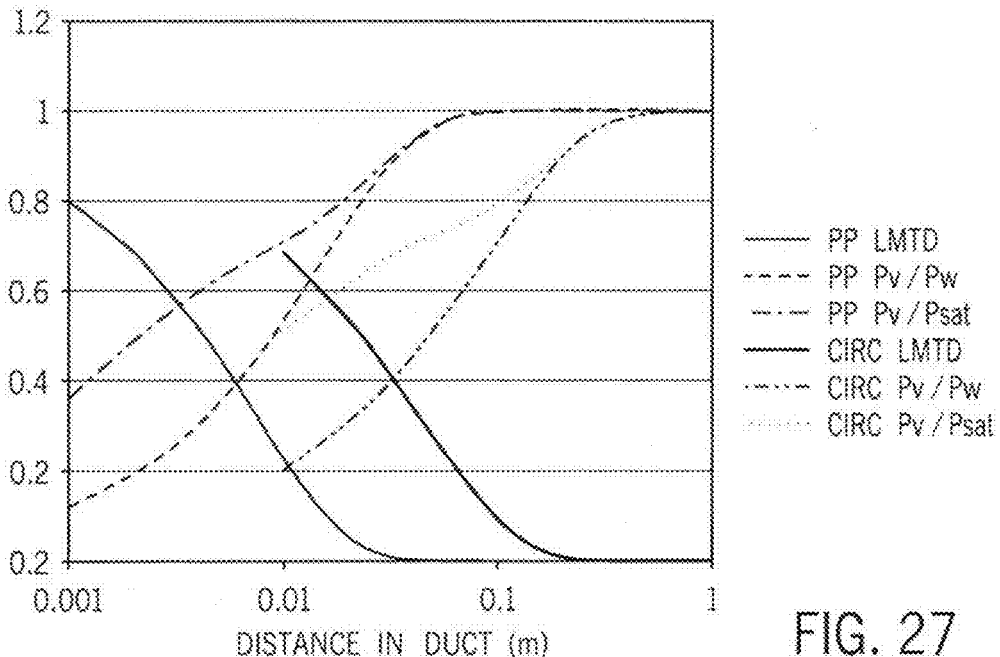
FIG. 27 is a graph showing a plot of temperature and vapor pressure as a function of axial position for an obround (PP) versus circular (Circ) saturator crossection.
Figure 28:
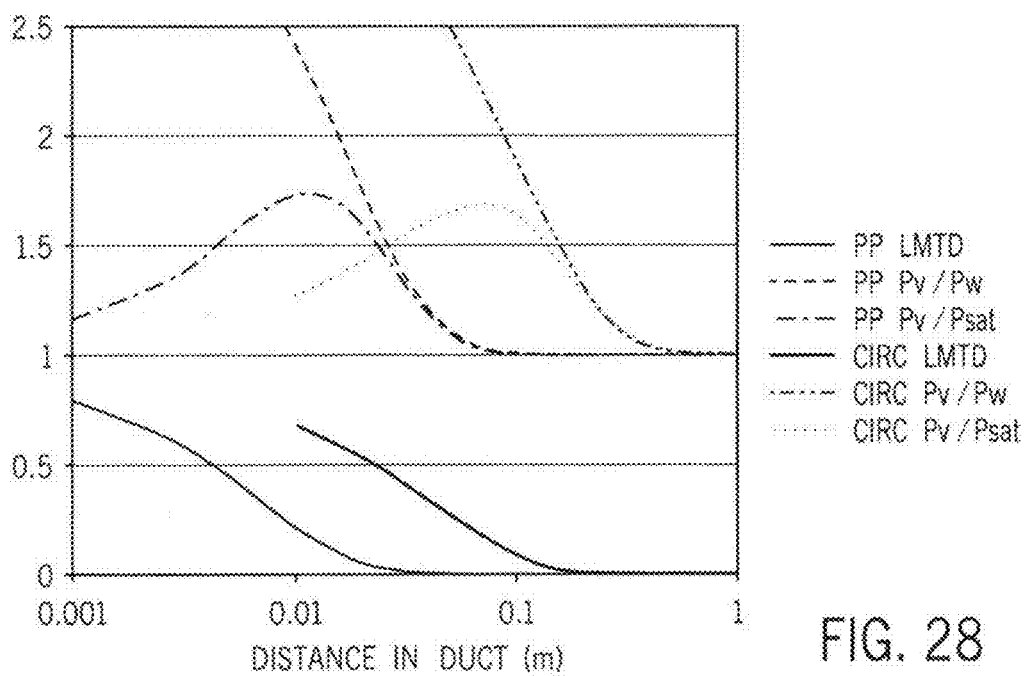
FIG. 28 is a graph showing a plot of temperature and vapor pressure as a function of axial position for the condenser section.
Figure 29:
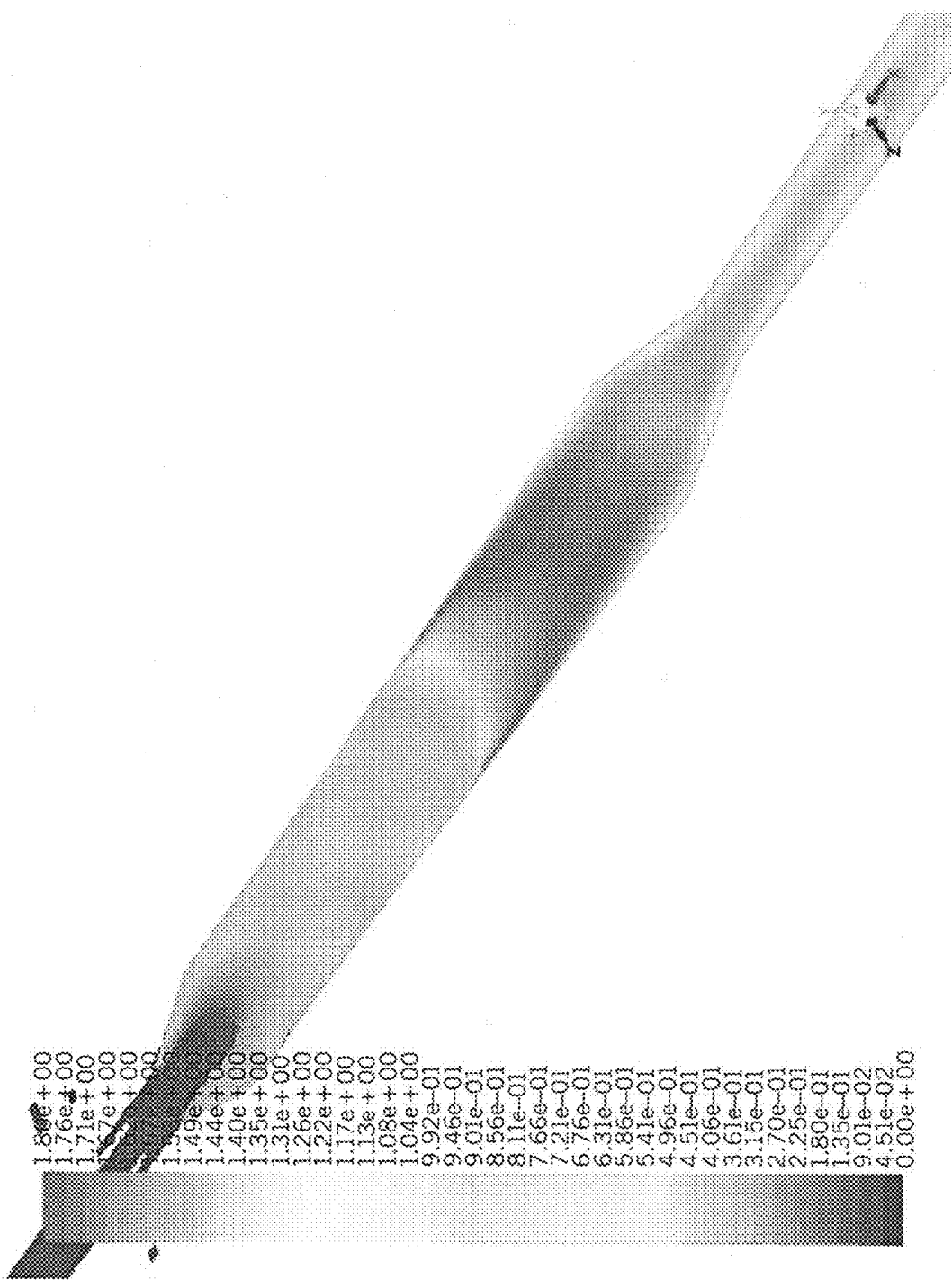
FIGS. 29 and 30 illustrate the computational fluid mechanics results for the saturation ratio within a sheathed PVR fluid section.
Figure 30:
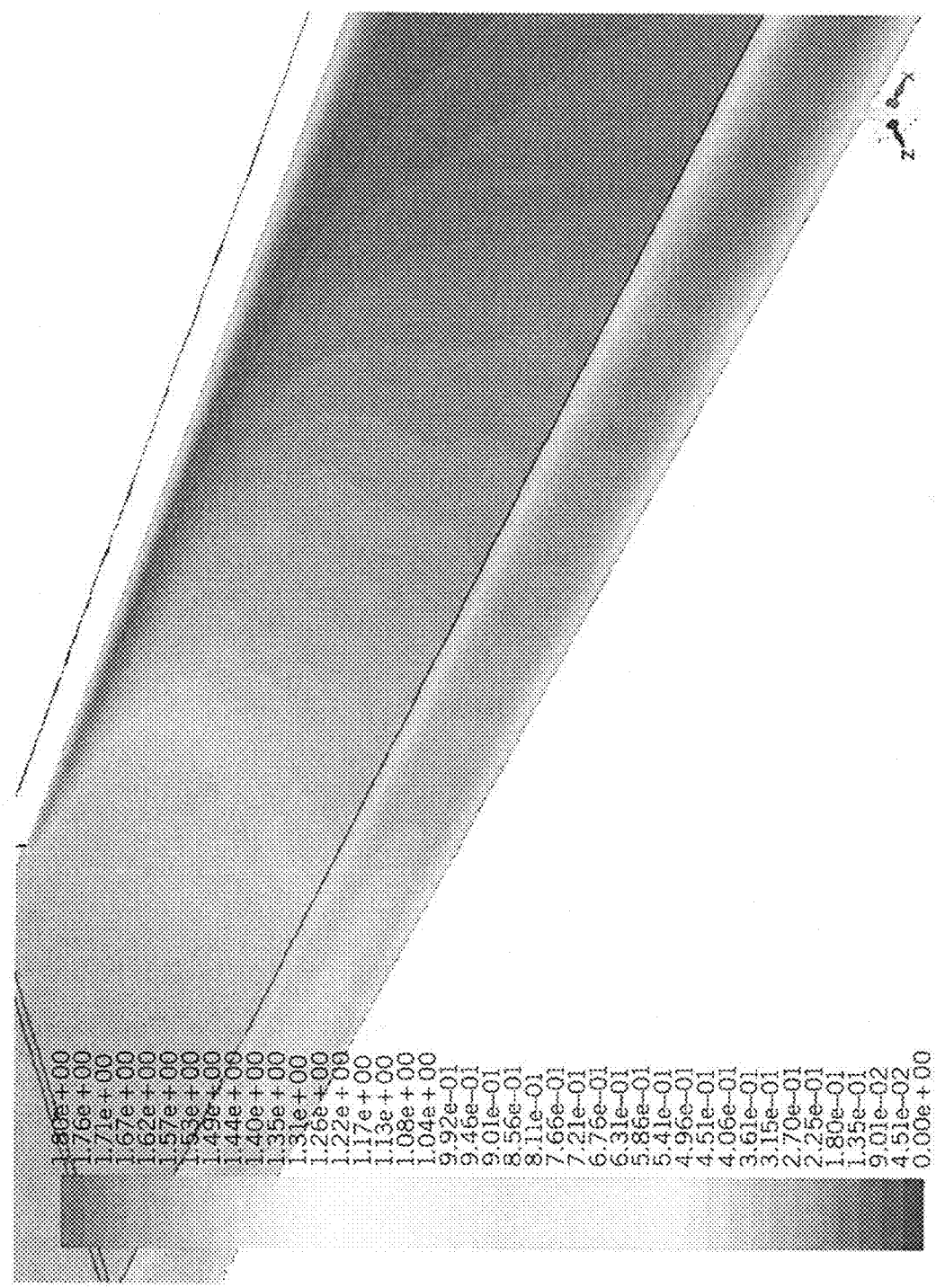
Figure 31:
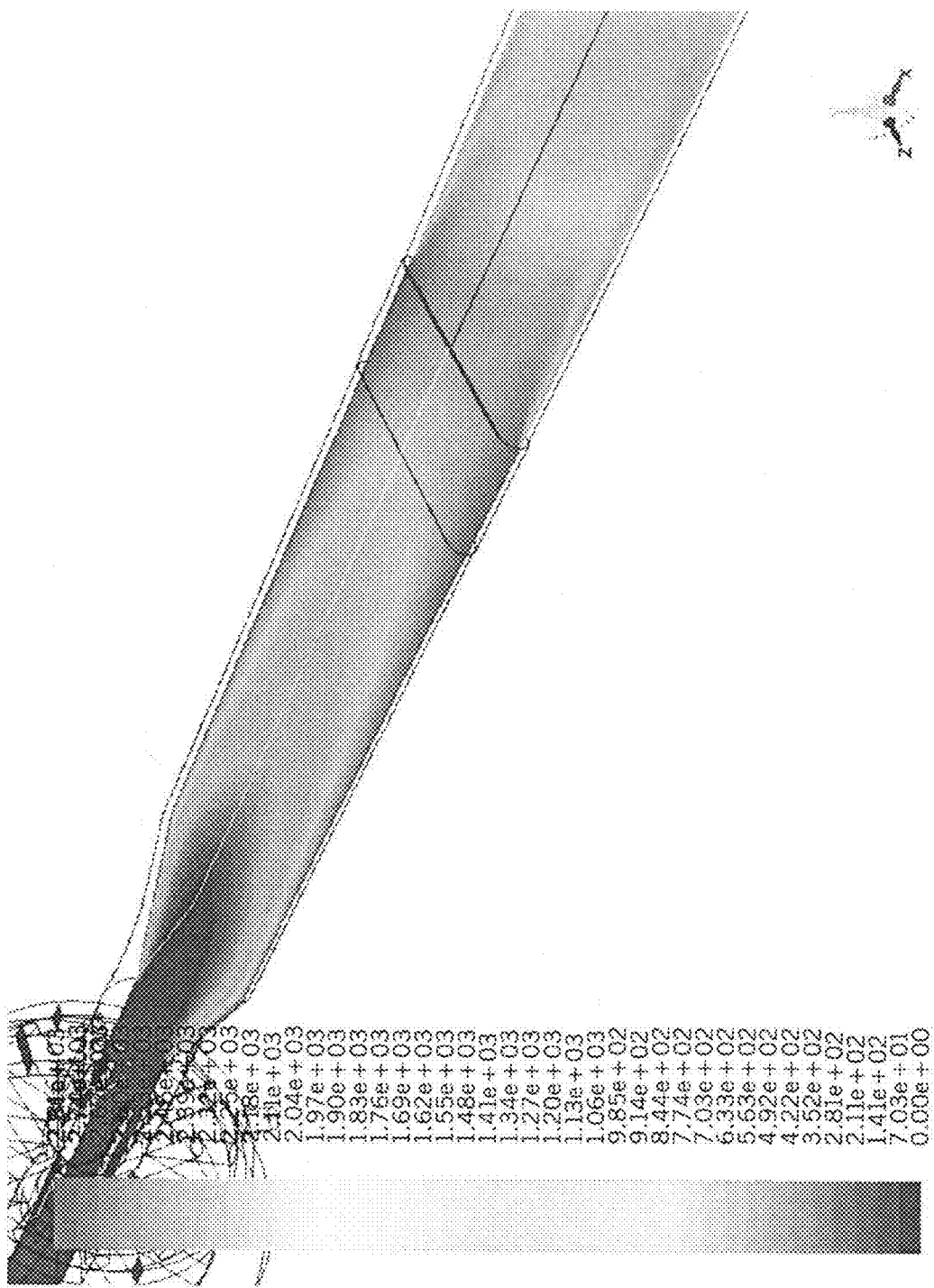
FIGS. 31 and 32 illustrate computational fluid mechanics results for vapor pressure within a sheathed device.
Figure 32:
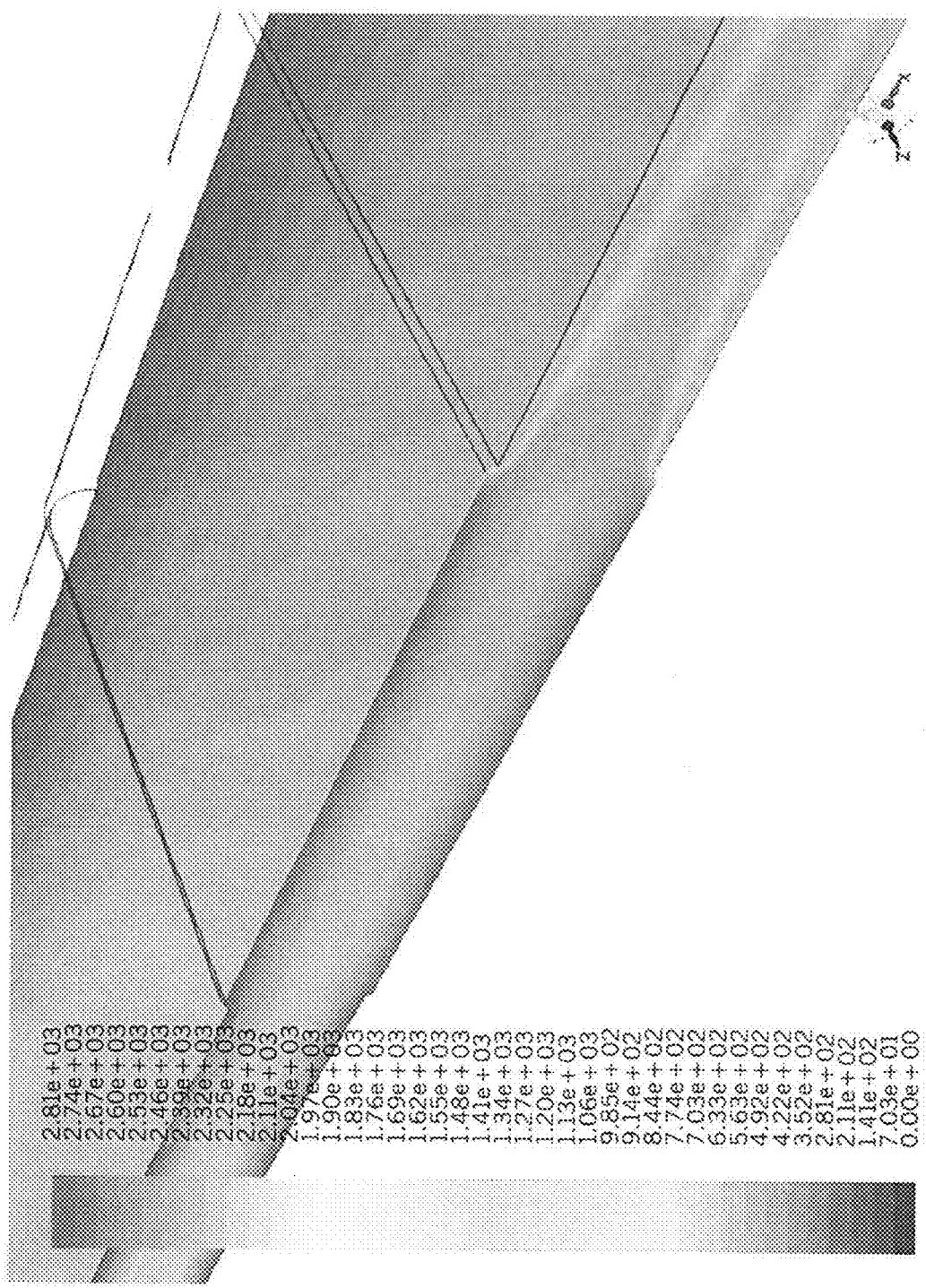
Figure 33:
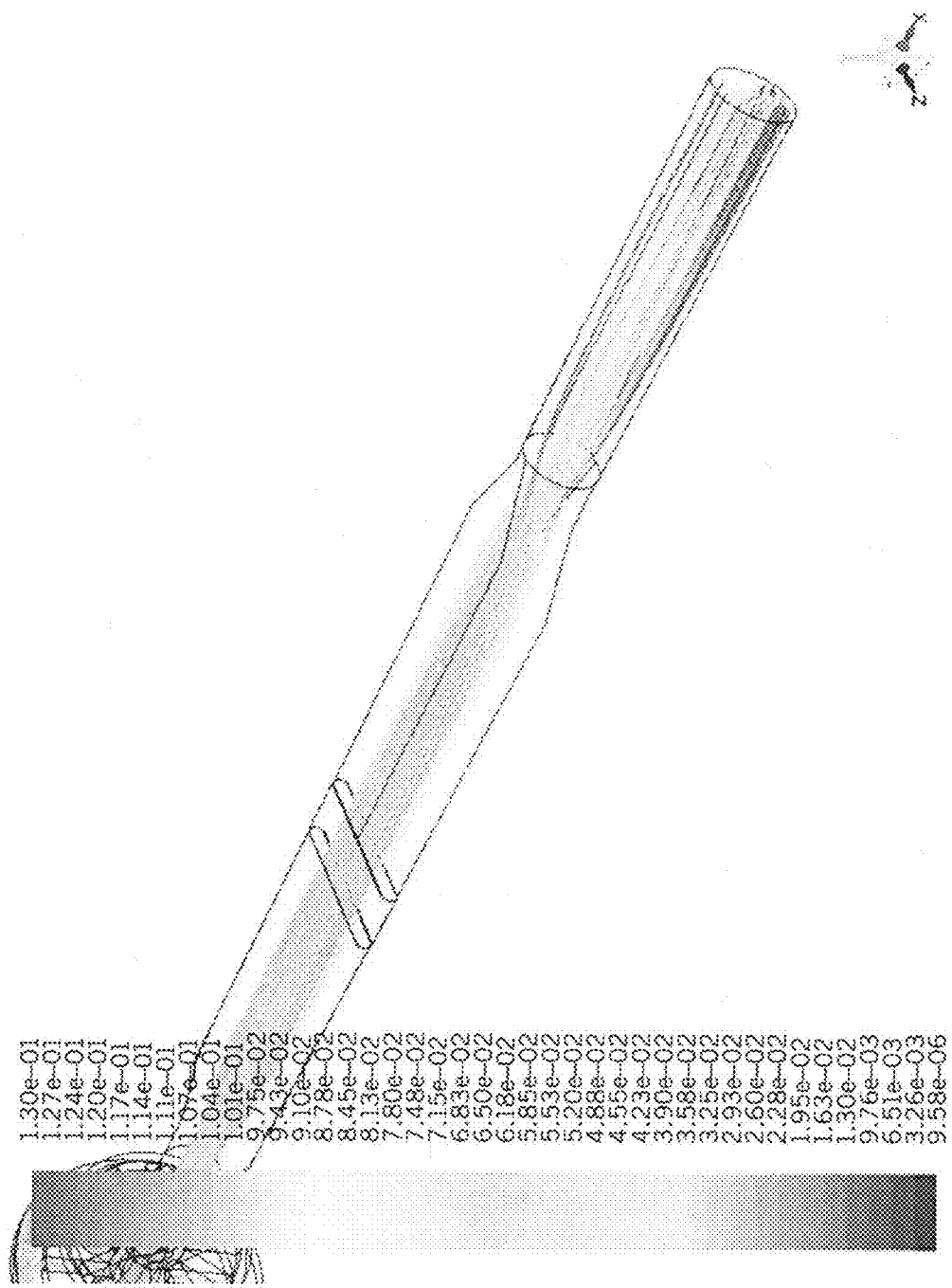
FIG. 33 shows path lines of aerosol flow within a sheathed device.

FIGS. 24-26 show computational fluid mechanics results for the CPC and PVR of FIGS. 1-6. FIG. 24 shows the saturation ratio within a sheathed PVR fluid section. In this model, the sheath and aerosol flows are each 300 cm$^3$/min. FIGS. 25-26 show path lines of the aerosol flow within the sheathed device.

Figure 8:
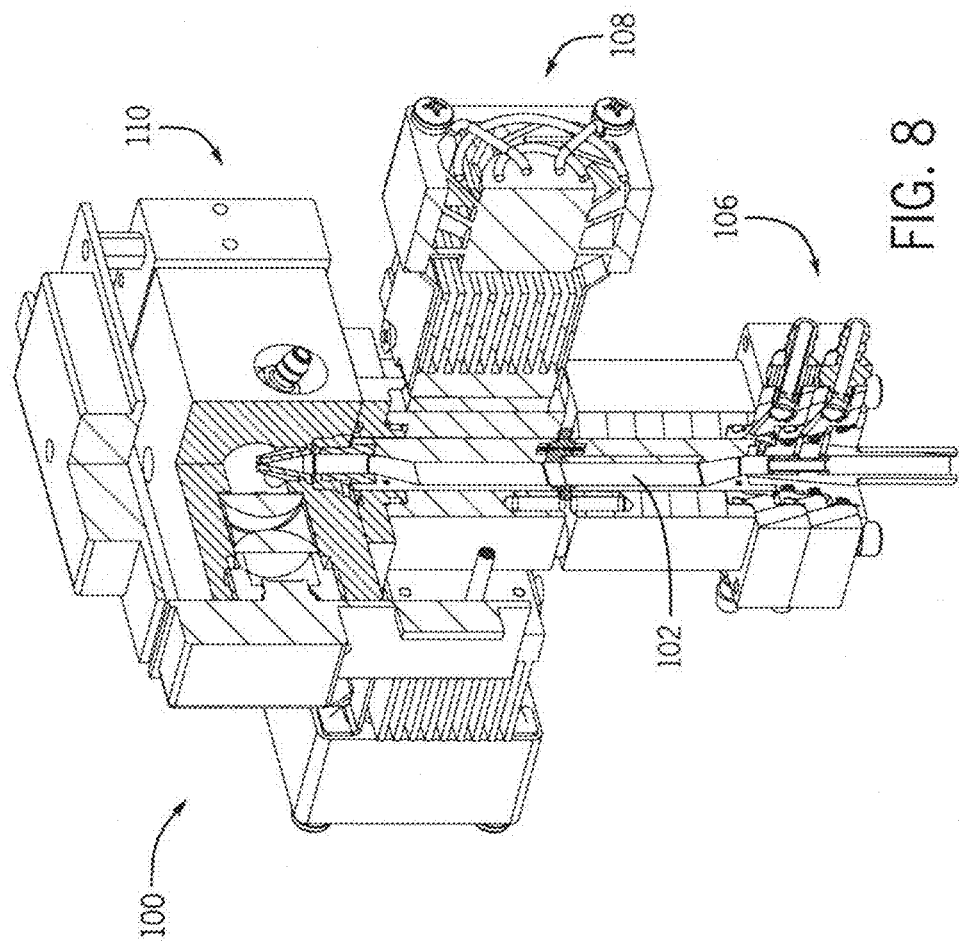
FIG. 8 is perspective view of a second embodiment of the CPC of the invention, partially in section to show a PVR thereof.

A second embodiment of the CPC 100 is shown in FIGS. 8-10. The CPC 100 includes a PVR 102, an aerosol inlet 104, a fluid supply section 106, a heating section 108, and an optical detection section 110. In this embodiment, the CPC 100 includes sample sheathing functionality. The fluid supply section 106 preferably includes liquid supply, a sheath inlet, a transport outlet and a vent ingress/egress means. Such means may be associated with pumps. The PVR 102 functions include amplifying the size of Nano-particles for optical detection in section 110.

Referring also to FIGS. 12-15, in this embodiment of the invention, the PVR 102 also has an elongated body of a predetermined length. The body wall defines an inner, longitudinally oriented fluid flow conduit which extends from an input end (shown disposed at the lower or bottom end in the drawings) and an outlet end (shown disposed at the upper or top end in the drawings). The PVR 102 conduit has a saturator or saturation section 120 and a 110 condensor section 122. The sections 120 and 122 are separated laterally in this embodiment of the PVR by a separator 124. The separator 124 thermally and electrically insulates the conditioner and growth sections 120 and 122 from each other.

Further, each section 120 and 122 is preferably constructed of separate but connected lateral members 120 A/B and 122 A/B divided along their longitudinal axis.

The CPC 100 and PVR 102 function as follows. An analyte is continuously aspirated into a cylindrical conduit AI where a portion of the analyte near the conduit walls acting as a transport flow is axisymmetrically aspirated from the conduit at ST. The remaining analyte passes through a sample conduit at SC. The transport flow is filtered to remove particles and a prescribed volumetric rate is axisymmetrically reintroduced around the sample conduit as a sheath flow at SM. The sheath flowrate is nominally equivalent to the transport flowrate. Optionally, a flow valve (for example, a flow rate valve 32 as shown in FIG. 1) may used to optionally operate the system 100 at a transport flowrate above the sheath flowrate.

The sheathed sample exits a cylindrical conduit at SS and enters the saturator section 120 a region at TR where the cross section of the conduit transitions from circular to obround. Starting at this transition, the conduit is fabricated from a material that supplies a liquid film at the wall surface such as a porous metal, felt, membrane, or porous plastic WI and W11. The liquid is preferably provided by a push/pull pumping system where a communicatively connected liquid supply pump (not shown) injects liquid from a supply bottle or the like (not shown) to the base of the porous section at BI and a communicatively connected drain pump (not shown) removes the liquid at BE and returns it to the supply bottle. The drain rate is greater than the supply rate which ensures that a minimal volume of liquid is present in the system. Liquid is also confirmed by monitoring the increased conductivity between F1 and the outer metal surface of the porous conduit when liquid is present. The liquid at the surface maintains a saturated vapor pressure that diffuses into the sheathed sample flow while simultaneously the temperature of the flow is modulated to the wall temperature. The wall temperature is controlled using heaters 108 installed at H1 and H2. The saturator section 120 is sufficiently long so that the vapor pressure and temperature of sheathed sample flow reach design conditions. For the device described herein the design conditions are a Log Mean Temperature Difference (LMTD)<1% and a Saturation Ratio (S=Vapor pressure/Saturated Vapor Pressure) >0.9.

Following the saturator section, the sheathed sample enters the condenser section 122 where the conduit walls are maintained at a prescribed temperature. The saturator and condenser conduits are separated by a short conduit fabricated from a thermally insulating and static dissipative material at SP. As the sheathed sample traverses the condenser section 122 the temperature and vapor pressure of the flow modulates to the match the wall conditions. The wall temperature in the condenser section 122 is controlled using thermoelectrics devices installed at T1 and T2. Supersaturation is achieved by exploiting the Lewis number (Le) for the system (Le=ratio of thermal diffusivity to vapor diffusivity). For systems where Le>1 the condenser walls are held at a lower temperature than the hulk temperature of the flow. This results in the temperature of the flow decreasing at a faster rate than the vapor pressure. The resulting ratio of the actual vapor pressure to the saturated vapor pressure calculated from the gas temperature is referred to as the Saturation ratio (S). The supersaturated vapor will then condense onto sufficiently large particles within the sheathed sample flow. The system is designed such that following supersaturation, the total condensed vapor onto the particles is controlled by reducing the residence time of the particles in this region. Controlling the amount of condensed vapor will reduce modulation of the temperature and vapor pressure caused by high particle concentrations.

Near the exit of the condenser section 122 the conduit transitions from an obround to circular shape at TE. The transition back to cylindrical flow at SE is done to facilitate focusing the sample stream at nozzle N1. The flow then enters an optical detection device OP where the sample passes through a region with incident electromagnetic radiation that is scattered by the presence of a sufficiently large object (in this case, a particle with condensed vapor). The scattered radiation is detected by a sensor and is registered as a detected particle by the device.

FIGS. 16-23 shows detailed drawings of the porous sections 120 A and B, and 122 A and B. For the device described herein the condenser 122 conduit is fabricated using a porous metal (Metapor™). In the saturator section 120 a porous plastic sheet (Fritware from SP Scienceware) W11 is inserted into the porous metal housing to provide a higher pore density for supplying liquid at the surface. The angles of the transition regions are designed so that flow separation does not occur.

FIG. 27 is a graph shows a plot of the temperature and vapor pressure as a function of axial position for an obround (PP) versus circular (Circ) saturator cross section. For the comparisons in FIG. 27, the conduit velocity was fixed at 1 m/s, sheathed sample flowrate was set a 10 $cm^3$/sec and the aspect ratio (obround width to height) was set to 10. The plots clearly show the advantage gained in the shorter overall length in the obround device for equivalent plug flow velocities. For the device described herein, the saturator section is designed so that the flow reaches a bulk mean saturation ratio of 0.9 with the center of the flow being below the mean and the flow near the walls being above it. The purpose of this is to provide a uniform peak supersaturation across the flow conduit which facilitates a sharper detection cutoff as a function of size. This practice also applies for the circular conduit.

FIG. 28 is a graph showing a plot of the temperature and vapor pressure as a function of axial position for the condenser section FIGS. 29 and 30 show computational fluid mechanics results (contours of saturation ratio S) for the saturation ratio within a sheathed PVR fluid section. In this model, the sheath and aerosol flows are each 300 $cm^3$/min.

FIGS. 31-32 shows computational fluid mechanics results (contours of vapor pressure in Pa) for the vapor pressure.

FIG. 33 shows path lines of the aerosol flow within the sheathed device.

FIG. 11 shows a modification to the bottom end of the CPC 100, forming an alternative embodiment of the CPC 200, whereby the CPC 200 operates in an unsheathed mode.

The embodiments above are chosen, described and illustrated so that persons skilled in the art will be able to understand the invention and the manner and process of making and using it. The descriptions and the accompanying drawings should be interpreted in the illustrative and not the exhaustive or limited sense. The invention is not intended to be limited to the exact forms disclosed. While the application attempts to disclose all of the embodiments of the invention that are reasonably foreseeable, there may be unforeseeable insubstantial modifications that remain as equivalents. It should be understood by persons skilled in the art that there may be other embodiments than those disclosed which fall within the scope of the invention as defined by the claims. Where a claim, if any, is expressed as a means or step for performing a specified function it is intended that such claim be construed to cover the corresponding structure, material, or acts described in the specification and equivalents thereof, including both structural equivalents and equivalent structures, material-based equivalents and equivalent materials, and act-based equivalents and equivalent acts.

The invention claimed is:

1. A particle vapor reactor comprising a reactor body with a fluid flow conduit having an inlet end, an outlet end, and a length, width and height, the fluid flow conduit having a longitudinal axis extending along the entire length from the inlet end to the outlet end, the cross-section of the fluid flow conduit having a circular geometry at the inlet end, an obround geometry at a midsection including two opposing, flat members of a wall of the reactor body, and a circular geometry at the outlet end, the flat members being aligned parallel with the longitudinal axis of the fluid flow conduit, the fluid flow conduit being bounded by the reactor body wall, and whereby the distance between opposing sides of the reactor body wall at the midsection is equidistant from the longitudinal axis of the fluid flow conduit at any point along the axis, the distances fanning a uniform fluid flow path in the midsection;
   wherein the fluid flow conduit has a saturator section disposed towards the inlet end and a condenser section disposed towards the outlet end;
   wherein the crossectional geometry at the inlet end of the fluid flow conduit has an increasing width and decreasing height from the inlet end towards the midsection;
   wherein the crossectional geometry at the outlet end of the fluid flow conduit has a decreasing width and increasing height from the midsection towards the outlet end;
   wherein the crossectional geometry of the fluid flow conduit at the midsection transitions from the circular inlet end to obround at the midsection, and transitions from the obround midsection to the circular outlet; and
   the inlet end adapted to receive an aerosol sample stream.

2. The reactor of claim 1, whereby:
   (a) the transition at the inlet end of the fluid flow conduit to the obround crossectional geometry minimizes fluid flow separation,
   (b) the obround crossectional geometry of the midsection of the fluid flow conduit reduces residence time of fluid flowing within the fluid flow conduit for a given vapor concentration; and
   (c) the transition from obround crossectional geometry of the midsection of the fluid flow conduit to the outlet end of the fluid flow conduit minimizes loss of vapor droplets due to inertia.

3. The reactor of claim 2, wherein the reactor body changes the temperature and vapor concentration of a material within the aerosol sample flowing in the fluid flow path.

4. The reactor of claim 3, wherein the fluid flow in the fluid flow path is laminar.

5. The reactor of claim 3, wherein the vapor concentration is changed towards the vapor concentration at the body wall of the conduit.

6. The reactor of claim 3, wherein the vapor concentration is increased via diffusion of vapor supplied from a liquid surface at the body wall of the conduit.

7. The reactor of claim 3, wherein the vapor concentration is decreased via diffusion of vapor to a liquid surface at the body wall of the conduit.

8. The reactor of claim 3, wherein the vapor concentration at the conduit body wall is defined w the temperature of the conduit body wall.

9. The reactor of claim 3, wherein the temperature of the aerosol sample stream is modified towards the temperature at the conduit body wall.

10. The reactor of claim 3, wherein the temperature of the aerosol sample stream is increased via diffusion of thermal energy from the conduit body wall.

11. The reactor of claim 3, wherein the temperature of the aerosol sample stream is decreased via diffusion of thermal energy to the conduit body wall.

12. The reactor of claim 3, wherein the vapor concentration within the aerosol sample stream is controlled to reach a predetermined, set value.

13. The reactor of claim 12, wherein the predetermined set value of the vapor concentration of the aerosol sample stream is equivalent to the saturation vapor pressure defined by the conduit body wall temperature.

14. The reactor of claim 12, wherein the predetermined set value of the vapor concentration is not equivalent to the saturation vapor pressure defined by the conduit body wall temperature.

15. The reactor of claim 2, wherein the vapor concentration within the aerosol sample stream reaches a level above the saturation vapor pressure calculated using the aerosol sample stream temperature.

16. The reactor of claim 2, wherein a gas is coaxially input to a perimeter of the aerosol sample stream as a sheathing flow at the inlet end of the reactor body.

17. The reactor of claim 16 wherein the vapor concentration of the sheathing flow gas is a predetermined, fixed value.

18. The reactor of claim 16, wherein the temperature of the sheathing flow gas is a predetermined, fixed value.

19. The reactor of claim 1, wherein the fluid flow conduit is elongated and constructed of two lateral half portions, the lateral half portions being joined along a longitudinal axis of the reactor body.

20. The reactor of claim 1, wherein the fluid flow conduit is elongated and constructed of four quarter portions, the quarter portions being connected into two lateral half portions, which lateral half portions are then joined along a longitudinal axis of the reactor body, the quarter portions of each longitudinal half portion further being separated from each other by a thermally and electrically insulative separator member.

21. The reactor of claim 1, being communicatively coupled to a condensation particle counter comprising an aerosol sample inlet communicatively connected to the inlet end, a fluid supply section communicatively connected to the inlet end, a heating section communicatively connected to the exterior of the reactor body, and a detection section communicatively connected to the outlet end.

22. A particle vapor reactor for use in a condensation particle counter, comprising:
   a reactor body with a fluid flow conduit having an inlet end, an outlet end, and a length, width and height, the crossection of the fluid flow conduit having a predetermined geometry at the inlet end, the fluid flow conduit having a longitudinal axis extending along the entire length from the inlet end to the outlet end, an obround geometry at a midsection including at least two opposing, flat walls, and a predetermined geometry at the outlet end, the flat walls being aligned parallel with the longitudinal axis of the fluid flow conduit, the fluid flow conduit being bounded by a reactor body, and whereby the distance between opposing sides of the reactor body at the midsection is equidistant from the longitudinal axis of the fluid flow conduit at any point along the axis;

wherein the predetermined geometry at the inlet end of the fluid flow conduit has an increasing width and decreasing height from the inlet end towards the midsection;

wherein the predetermined geometry at the outlet end of the fluid flow conduit has a decreasing width and increasing height from the midsection towards the outlet end;

wherein the inlet end is adapted to receive an aerosol sample stream;

the fluid flow conduit defining a saturator section disposed towards the inlet end and a condenser section disposed towards the outlet end; and wherein the predetermined geometry of the fluid flow conduit at the inlet end transitions from circular to obround, and the predetermined geometry of the fluid flow conduit at the outlet end transitions from obround to circular.

* * * * *